United States Patent
Aftab et al.

(10) Patent No.: US 10,114,617 B2
(45) Date of Patent: Oct. 30, 2018

(54) RAPID VISUALIZATION RENDERING PACKAGE FOR STATISTICAL PROGRAMMING LANGUAGE

(71) Applicant: AT&T Intellectual Property I, L.P., Atlanta, GA (US)

(72) Inventors: Syed Anwar Aftab, Budd Lake, NJ (US); Sundar Ramalingam, Denville, NJ (US); Abbas Munawar Fazal, Bridgewater, NJ (US); Sunder Tattavarada, North Brunswick, NJ (US); Arthur W. Martella, Morris Plains, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 191 days.

(21) Appl. No.: 15/180,965

(22) Filed: Jun. 13, 2016

(65) Prior Publication Data

US 2017/0357488 A1    Dec. 14, 2017

(51) Int. Cl.
| | | |
|---|---|---|
| *G06F 9/44* | (2018.01) | |
| *G06F 8/30* | (2018.01) | |
| *G06F 17/22* | (2006.01) | |
| *G06F 17/21* | (2006.01) | |

(52) U.S. Cl.
CPC .............. *G06F 8/31* (2013.01); *G06F 17/211* (2013.01); *G06F 17/2247* (2013.01); *G06F 17/2264* (2013.01); *G06F 17/2288* (2013.01)

(58) Field of Classification Search
None
See application file for complete search history.

(56) References Cited

U.S. PATENT DOCUMENTS

| | | | |
|---|---|---|---|
| 6,286,017 B1 | 9/2001 | Egilsson | |
| 6,438,573 B1 | 8/2002 | Nilsen | |
| 9,110,956 B2 * | 8/2015 | Hobbs | ............... G06F 17/30536 |
| 9,146,956 B2 | 9/2015 | Zhao | |

(Continued)

OTHER PUBLICATIONS

"Ggplot2 Quickref", http://web.archive.org/web/20160310003517/http://r-statistics.co/ggplot2-cheatsheet.html, dated Mar. 10, 2016, retrieved on Dec. 21, 2017.*

(Continued)

*Primary Examiner* — Philip Wang

(57) ABSTRACT

Methods, non-transitory computer readable media, and devices are disclosed for rendering a visualization using a package to expand a statistical programming language. For example, a processor may load the package, which may comprise a plurality of application programming interfaces including a first application programming interface for generating a first object to contain a metadata set and a second application programming interface for generating a second object for rendering a visual output to present via a display. In one example, the metadata set includes content data and information regarding a formatting of at least one visualization based on the content data. The processor may further configure the first object via the first application programming interface, configure the second object via the second application programming interface, and render the visual output via the second object, the visual output including the at least one visualization.

20 Claims, 7 Drawing Sheets

(56) References Cited

U.S. PATENT DOCUMENTS

| | | | |
|---|---|---|---|
| 2012/0131563 A1* | 5/2012 | Das | G06F 11/323 |
| | | | 717/168 |
| 2014/0068488 A1* | 3/2014 | Goh | G06F 3/0484 |
| | | | 715/771 |
| 2014/0164444 A1 | 6/2014 | Bowen et al. | |
| 2014/0229491 A1 | 8/2014 | Bhattacharjee et al. | |
| 2015/0088936 A1 | 3/2015 | Wang et al. | |
| 2015/0095841 A1 | 4/2015 | Fiedler et al. | |
| 2015/0347101 A1* | 12/2015 | Boehm | G06F 8/41 |
| | | | 717/140 |
| 2016/0048557 A1 | 2/2016 | Hall et al. | |
| 2016/0205137 A1* | 7/2016 | Babb | H04L 63/20 |
| | | | 726/1 |
| 2017/0235466 A1* | 8/2017 | Tanwir | G06F 3/04847 |
| | | | 715/738 |
| 2017/0286549 A1* | 10/2017 | Chandnani | G06F 17/30867 |

OTHER PUBLICATIONS

"Interactive visualizations with R—a minireview", Nov. 21, 2014, http://ouzor.github.io/blog/2014/11/21/interactive-visualizations.html, retrieved on Dec. 21, 2017.*

* cited by examiner

200

1  library(rSpeed); # Load the rSpeed library
2  customHtmlFromAsset <- rcloud.get.asset("custom.html"); #Load custom HTML file (optional)
3  metaData <- rcloud.get.asset ("meta.json"); # Load report definition file
4  rs <- RSpeedMeta$new(); # Create Rspeed object to hold report metadata
5  Rs$loadJson(jsonString=metaData); # Apply report definition file to RSpeedMeta object
6  rWeb <- RSpeedWeb$new(); # Create Rspeed object for web presentation
7  rWeb$setDataTable(TRUE); # Enable data table visualization
8  rWeb$setMap(TRUE); # Enable map visualization
9  rWeb$render(rspeedobject=rs, customHtml=customHTMLFromAsset); # Render the visualization to the browser

```
{
  "rspeed": {
    "title" : "Launches by Market",          ←—310
    "dataSourceList": [ {                    ←—320
      "id": "DB1",
      "type": "DBTYPE1",
      "url": "jdbc:abc:@hostname.att.com:port:SID",
      "username": "username",
      "pwd": "password"
    } ],
    "formFields": [ {                        ←—330
      "id": "ff1",
      "visible": true,
      "name": "Region",
      "type": "DROPDOWN",
      "defaultValue": "",
      "mandatory": false,
      "sql": "select distinct official_region id, upper(official_region) name from demo_template where official_region is not null order by official_region"
    },
    {
      "id": "ff2",
      "visible": true,
      "name": "Market",
      "type": "DROPDOWN",
      "defaultValue": "",
      "mandatory": false,
      "sql": "select distinct official_marketcluster id, upper(official_marketcluster) name from demo_template where official_region is not null order by official_marketcluster"
    } ],
    "datatable": {                           ←—340
      "pagesize": 10,
      "columns": "region, market, launches",
      "innerquery": [
        " select official_region region, official_marketcluster market, count(*) launches from ",
        " demo_template ",
        " where 1=1 ",
        " and official_marketcluster is not null ",
        " group by official_region, official_marketcluster  order by official_region, official_marketcluster"
      ]
    },
    "chart": {                               ←—350
      "xAxisLabel": "REGION",
      "yAxisLabel": "LAUNCHES",
      "category": "MARKET",
      "type": "GROUP_BAR_CHART"
    }
  }
}
```

```
library(rSpeed);

rs = RSpeedMeta$new();                                    ← 410 rs$setTitle("Launches by Market");                        ← 420 rsds = RSpeedDataSource$new(id="DB1", url="jdbc:abc:@hostname.att.com:port:SID",
username="username");
rsds$setPwd("password");
rs$addDataSource(rsds);                                   ← 430 rsff1 = RSpeedFormField$new(id="ff1", name="Region", defaultValue="", blankValue="");
rsff1$setSql("select distinct official_region id, upper(official_region) name from
demo_template where official_region is not null order by official_region");
rs$addFormField(rsff1);                                   ← 440 rsff2 = RSpeedFormField$new(id="ff2", name="Market", defaultValue="", blankValue="");
rsff2$setSql("select distinct official_marketcluster id, upper(official_marketcluster) name
from demo_template where official_region is not null order by official_marketcluster");
rs$addFormField(rsff2);
                                                          ← 450
rsdt = RSpeedDataTable$new();
rsdt$setPageSize(10);
rsdt$setColumns("region, market, launches");
rsdt$setQuery("select official_region region, official_marketcluster market, count(*)
launches from demo_template where 1=1 and official_marketcluster is not null group by
official_region, official_marketcluster order by official_region, official_marketcluster");
rs$setDataTable(rsdt);

rsc = RSpeedChart$new(xAxisLabel="REGION", yAxisLabel="LAUNCHES");    ← 460
rsc$setCategory("MARKET");
rsc$setType("GROUP_BAR_CHART");
rs$setChart(rsc);

# get the rSpeedWeb object                                ← 470
rWeb = RSpeedWeb$new();
rWeb$setDataTable(TRUE);
rWeb$setChart(TRUE);
rWeb$render(rspeedobject=rs,customHtml=NA);
```

FIG. 4

RAPID VISUALIZATION RENDERING PACKAGE FOR STATISTICAL PROGRAMMING LANGUAGE

The present disclosure relates generally to statistical programming languages, and more particularly to devices, computer-readable media, and methods which utilize a package that expands a statistical programming language for rapid visualization rendering and network-based application development.

BACKGROUND

Statistical programming languages like R are very powerful and widely used among statisticians and data miners for data analysis. The R statistical programming language has a rich library set and is open source. R is therefore popular for adaptations such as for big data analytics, optimization and statistical modeling, and so on. However, R is typically used for ad hoc analysis. In addition, accessing the end results is generally confined to the integrated development environment (IDE).

SUMMARY

In one embodiment, the present disclosure provides a method, computer readable medium, and device for rendering a visualization using a package to expand a statistical programming language. For example, a processor may load the package, which may comprise a plurality of application programming interfaces. The plurality of application programming interfaces may include a first application programming interface for generating a first object to contain a metadata set and a second application programming interface for generating a second object for rendering a visual output to present via a display. In one example, the metadata set includes content data and information regarding a formatting of at least one visualization based on the content data. The processor may further configure the first object via the first application programming interface, configure the second object via the second application programming interface, and render the visual output via the second object, the visual output including the at least one visualization.

BRIEF DESCRIPTION OF THE DRAWINGS

The present disclosure can be readily understood by considering the following detailed description in conjunction with the accompanying drawings, in which:

FIG. 2 illustrates an example statistical programming language notebook, according to the present disclosure;

FIG. 3 illustrates an example text-based data interchange format configuration file, according to the present disclosure;

FIG. 4 illustrates an additional example statistical programming language notebook, according to the present disclosure;

To facilitate understanding, identical reference numerals have been used, where possible, to designate identical elements that are common to the figures.

DETAILED DESCRIPTION

Figure 1:
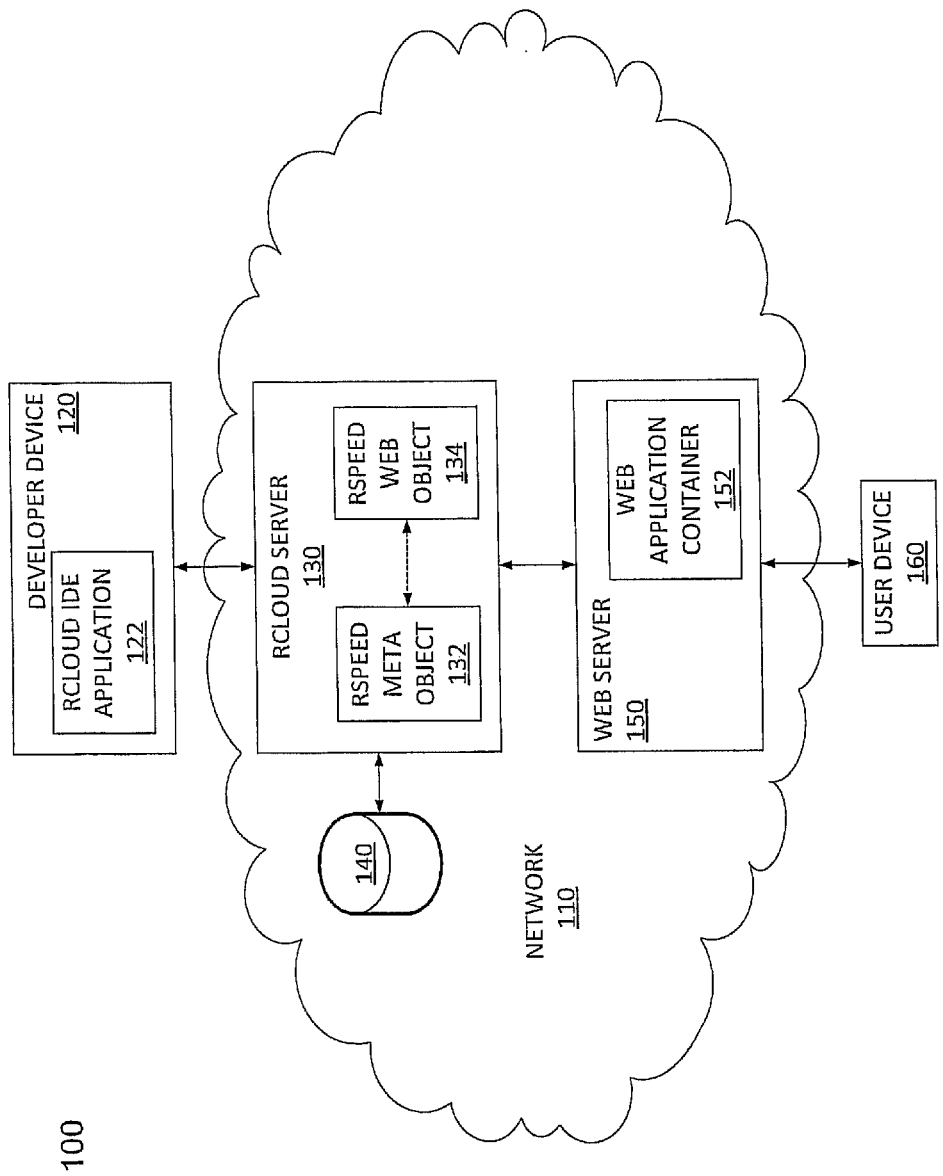
FIG. 1 illustrates an example system, according to the present disclosure.

Statistical programming languages are widely used among statisticians and data miners for data analysis. Web application containers are utilized to develop distributed scalable enterprise applications with object-oriented web and service layered components. The present disclosure integrates a statistical programming language, such as R, with an object-oriented web application programming language, such as JavaScript, and permits rapid application development utilizing aspects of both environments. In one example, the capabilities of the statistical programming language are enhanced to include rapid generation of interactive analytical applications, which are accessible not only on within an integrated development environment (IDE) of the statistical programming language, but also via web application containers.

In the era of big data, data sets are so large that traditional data processing analytical applications may be inadequate. Statistical programming languages provides various capabilities for statisticians and data miners. However, there is a significant development efforts involved to analyze and provide interactive visual outputs for large data sets. On the other hand, web application containers, such as for Java, Java 2 Enterprise Edition (J2EE), and the like, provide object-oriented design and programming capabilities, but may require significant efforts in statistical modeling, specifically in the big data space. The present disclosure provides a bridge for integration between a statistical programming language and a web application container, with capabilities permitting rapid generation of analytics and visualizations in the statistical programming language, and an interface that enables the utilization of the resulting visualizations in interactive web applications.

Accessing the end results from a statistical programming language typically is confined to the IDE of the statistical programming language. Examples of the present disclosure provide an application programming interface (API) which reduces the burden of the complex programming and exposes results with filtering capability to web application containers. In one example, the API comprises a module which runs within a statistical programming language IDE. For instance, in one example, the present disclosure may comprise an R package which may be loaded as a library within an RCloud IDE. Web developers can utilize web application containers as a window to the statistical programming language IDE, with all the capabilities of service layers including security, concurrency, lifecycle management, transaction, deployment, and other services provided in web application containers, in addition to providing statistical modeling, optimization, machine learning, big data analytics, probability distributions, and the like.

In one example, the present disclosure comprises a package of different APIs that may be utilized for different purposes to expand the statistical programming language capabilities. In one example, the present disclosure may involve utilizing existing content data within a statistical programming language IDE, or may utilize an API of the present disclosure to load or generate content data from a relational database. The package may also include APIs for chart generation, map generation, and downloading capability that may be used by a developer to build analytical reports and/or interactive web applications. Complex code generation and data binding can be executed by the package behind the scenes. The results may be presented within the statistical programming language IDE or via an integrated web application container. Such a web application container may be interactive. For instance, the web application container may respond to a user's input and drive execution of the statistical programming language notebook, e.g., a file, program, or script, to generate updated results based on the interaction. This architecture enables statistical programming language analytics to be pluggable into web application containers and enables integrated development using a web platform. Thus, the present disclosure provides a hybrid approach of application development. It permits developers to use simple APIs in a statistical programming language IDE to generate data analytics and visualizations. The results are then available in the statistical programming language IDE and are also accessible via web application containers along with interactive capabilities. These and other aspects of the present disclosure are discussed in greater detail below in connection with the example FIGS. 1-4.

To aid in understanding the present disclosure, FIG. 1 illustrates an example system 100 in which examples of the present disclosure may operate or be deployed. For illustrative purposes, the example system 100 is described in connection with an RCloud IDE for the R language. However, it should be noted that in other examples, the present disclosure may implement a different type of statistical programming language and/or IDE. As shown in FIG. 1, system 100 may include a network 110 having an RCloud server 130, a web server 150, and a data storage device 140. The network 110 may comprise any one or more sub-networks having the same or different network technologies. For instance, network 110 may include one or more access networks, a core network/backbone network, a service provider network, and so on. For illustrative purposes, network 110 may comprise an Internet Protocol (IP) network. For instance, network 110 may represent the Internet in general. In one example, the RCloud server 130 may provide a development environment for a developer to engage in statistical analysis of various data sets via the RCloud IDE application 122 operating on developer device 120. For instance, RCloud server 130 may provide a server-based integrated development environment (IDE) for a developer to create, edit, and run RCloud notebooks via the RCloud IDE application 122, when the developer device accesses the RCloud server 130 via network 110. In one example, the RCloud IDE may also provide a command line interface for entering commands/instructions line-by-line in the R language. In one embodiment, RCloud server 130 may comprise a computing system, such as computing system 700 depicted in FIG. 7, and may be configured to provide one or more functions for rendering a visual output using a package to expand a statistical programming language in accordance with the present disclosure. For example, RCloud server 130 may be configured to perform functions such as those described below in connection with the example method 600 of FIG. 6.

In one example, RCloud server 130 may be loaded with an additional package (which may be referred to herein as "RSpeed"), that extends the RCloud IDE to provide additional functions. For instance, RSpeed may include a number of application programming interfaces (APIs) providing different features. For instance, first API of RSpeed may include a function call for creating a new RSpeed "metadata object." In one example, the RSpeed package may utilize this new type of object as a data structure to store a metadata set comprising certain configuration parameters and content data. The configuration parameters may comprise information regarding a formatting of at least one visualization based upon the content data, as described in greater detail below. In one example, the RSpeed package may also include a second API, which may include a function call for creating an RSpeed "web object." In one example, the RSpeed package may utilize this new type of object as a data structure to store preferences regarding how the output of a RSpeed notebook is to be presented, e.g., different types of built-in visualizations that may be enabled, whether a visual output is to include a custom user interface or custom visualizations, and so on. The second API may also include function calls for activating certain types of visualizations via the RSpeed web object, a function call to render a visual output comprising the visualization(s) via the RSpeed web object, and so on. Additional APIs of the RSpeed package/library may include an API having a function call for loading a configuration file, e.g., written in a text-based data interchange format, such as a Java Script Object Notation (JSON) file, into an RSpeed metadata object. The RSpeed package may also include additional API and/or function calls for: creating a form field, creating a data table, creating a chart, creating a map, and creating other visualizations based upon configuration parameters that are provided in the RCloud notebook or in the configuration file, and which may be stored in the RCloud metadata object.

In one example, a developer may create an RCloud notebook via RCloud IDE application 120 for execution on RCloud server 130. The RCloud notebook may load the RSpeed package as a library and may specify: configuration parameters, a data source for content data, an R script for analytical operations, at least one type of visualization that is desired for a visual output, a custom user interface or custom visualizations, and so on. The package may be accessed in two different ways: via specific API function calls from the RCloud notebook, or via a separate configuration file which may be written in a text-based data interchange format, such as JSON. For instance, the configuration parameters may be specified in R script, e.g., R code, commands, and/or instructions contained in the RCloud notebook itself, or may be specified in a text-based data interchange format of the separate configuration file. Similarly, content data may be loaded via an instruction in the RCloud notebook, or may be loaded via a parameter in a configuration file. In either example, the content data may be retrieved from storage device 140 in accordance with the instruction. Alternatively, or in addition, the content data may already be loaded in the RCloud IDE.

Figure 5:
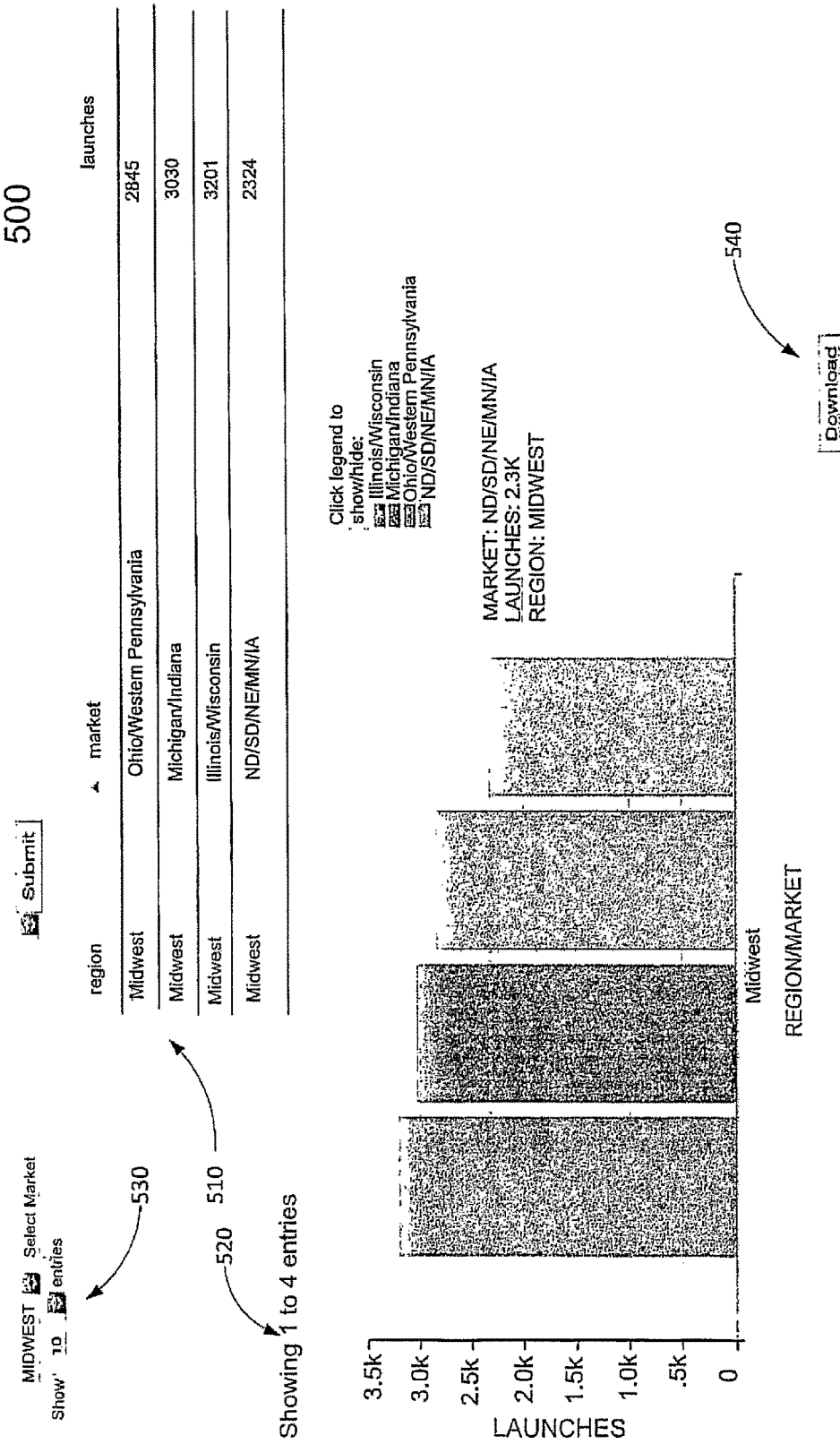
FIG. 5 illustrates an example output based upon to the example statistical programming language notebook of FIG. 2 or FIG. 4.

An R script may optionally be utilized to perform various analytical operations with respect to the content data. In one example, the R script may comprise a separate file that is loaded via an instruction in the RCloud notebook, or may comprise a portion of the RCloud notebook itself. The at least one type of visualization may be specified in the RCloud notebook, or in the separate configuration file. In one example, the at least one type of visualization may rely upon built in visualization types that are part of the RSpeed package/library. Alternatively, or in addition, any custom user interfaces or custom visualizations may also be specified in the RCloud notebook or in the configuration file. An example of an RCloud notebook that utilizes the RSpeed package is provided in FIG. 2, with an accompanying text-based data interchange format configuration file provided in FIG. 3. An example, of an RCloud notebook that utilizes the RSpeed package without an accompanying text-based data interchange format configuration file is provided in the FIG. 4. An illustrative output of either example, is shown in FIG. 5.

In one example, the output of an RCloud notebook may be exposed to web application containers via the RSpeed package/library. For instance, the visual output, e.g., comprising a user interface and the at least one type of visualization may be loaded into web application container 152 on web server 150. Thus, a user device 160 may connect to web server 150 and request access the notebook output. In one example, the user interface may comprise a default user interface that is provided by the RCloud IDE. In another example, the user interface may comprise a custom hypertext markup language (HTML) page and/or a cascading style sheet (CSS), a Java applet/servlet pair, a Java Script file embedded in a HTML page, and so forth. In one example, the user interface may include a server side script that runs via the web application container 152 and a client side script that may run on the requesting user device 160. The user interface may enable interactivity between user device 160 and the RCloud notebook. In one example, RCloud server 130 may also maintain a web socket between the RCloud server 130 and the web server 150. For example, the web socket may be used to pass parameters to RCloud server 130 based upon a user input. In response to the user input, and based upon the instructions contained in the RCloud notebook, RCloud server 130 may: update a RSpeed metadata object associated with the RCloud notebook, retrieve additional content data, re-execute an R script with respect to the additional content data, update an RSpeed web object associated with the RCloud notebook, re-render the at least one visualization and/or the visual output based upon the updated RSpeed metadata object or the RSpeed updated web object, and so forth.

It should be noted that the architecture of FIG. 1 is illustrative in nature and that various modifications to the system 100 are possible in accordance with the present disclosure. For example, data storage device 140 may be integrated within RCloud server 130 or web server 150, respectively, or may comprise one or more separate storage devices which may be collocated with one another, or which may reside in different physical locations. In addition, as illustrated in FIG. 1, RCloud server 130 and web server 150 are illustrated as being separate components. However, in another example, the functions of these devices may be integrated into a single device, e.g., in the form of computing system 700 depicted in FIG. 7, or in a similar device. Thus, these and other variations are all contemplated within the scope of the present disclosure.

FIG. 2 illustrates an example RCloud notebook 200 which utilizes an RSpeed package in accordance with the present disclosure. In this example, the RCloud notebook 200 utilizes a JSON configuration file 300 illustrated in FIG. 3. In line 1, the notebook 200 loads the RSpeed package into the RCloud IDE as a library. It should be noted that are used herein, the terms "loading," "storing," and the like, may refer to a processor loading, writing, or storing files, instructions, code, objects, and so forth into an attached or remote memory or a storage device, for subsequent execution, access, manipulation, etc. In line 2 of the notebook 200 an optional command loads a custom HTML file for a user interface of a visual output of the notebook 200. For instance, the developer of the notebook 200 or another developer may create a separate HTML file that may provide a user interface having a particular look and feel. In line 3 of the notebook 200, a report definition file, e.g., a "configuration file," is loaded and assigned to the variable "metadata." In one example, the report definition file is given by the example JSON configuration file 300 of FIG. 3. Line 4 of the notebook contains a call to an API "RSpeed-Meta" and the function call "new", which creates a new RSpeed metadata object called "rs." Line 5 of the notebook 200 invokes the function call "loadJson" of the RSpeedMeta API, which loads the report definition file/JSON configuration file into the RSpeed metadata object "rs."

Line 6 of the notebook 200 invokes an API "rSpeedWeb" and the function call "new," which creates a new RSpeed web object "rWeb." Lines 7 and 8 of the notebook 200 include calls to the rSpeedWeb API function calls "setDataTable" and "setMap." These function calls, or commands enable presentation of a data table visualization and a map visualization for the notebook 200 when the visual output is rendered. Line 9 of the notebook 200 invokes a "render" function call of the RSpeedWeb API, which renders the visual output comprising the visualization(s) that are enabled. In the example of FIG. 2, the call to the "render" function call includes parameters "rspeedobject=rs" and "customHtml=customHTMLFromAsset." The first parameter indicates that the rendering is with respect to the RSpeed metadata object "rs," and the content data and other information contained therein. The second parameter indicates that the visual output should be rendered by utilizing the custom user interface provided by the HTML file "custom.html" (assigned to the label "customHtmlFrom Asset" in line 2).

FIG. 3 illustrates an example configuration file 300 in a text-based data interchange format, e.g., JSON. In one example, JSON is utilized for a syntax that provides for simple relations between strings, numbers, booleans, null, arrays, and objects. As illustrated in FIG. 3, the configuration file 300 includes a JSON object "rspeed," which is itself comprised of several members, each of which may be parsed by the function call "loadJson" of the "RSpeedMeta" API to extract parameters that may be loaded into the RSpeed metadata object "rs," according to the notebook 200 of FIG. 2. The first member is a relation 310 which associates "title" with "Launches by Market." The second member is an array 320, "dataSourceList," with several sub-members comprising relations between strings. Each of these members may be parsed by the "loadJson" function call to extract parameters which may be used to obtain a set of source data. In one example, the source data may be obtained from "jdbc:abc:@hostname.att.com" according to the additional parameters in the array 320, e.g., using a user identification and password to obtain access to the file "DB1" having a type or format of "DBTYPE1." The third member is an array 330 with two sub-member arrays, each defining parameters for two different form fields, e.g., "ff1" and "ff2." For instance, these parameters may be loaded by loadJson into the RSpeed metadata object "rs" created via line 4 of the notebook 200 and may be digested by the RSpeed web object "rWeb" when rendering the visual output via line 9.

The fourth member is an object 340 containing parameters for rendering a data table visualization. The fifth member is an object 350 containing parameters for rendering a chart visualization. These parameters may also be loaded by loadJson into the RSpeed metadata object "rs" created via line 4 of the notebook 200 and may be digested by the RSpeed web object "rWeb" when rendering the output via line 9. Notably, JSON is substantially compatible with Java, which may be utilized at the output stage/front end of the examples of the present disclosure. For instance, a web application container front end may be based in Java, while accessing a statistical programming language based back end, e.g., R, or RCloud, enhanced with RSpeed. However, since the RSpeed package also enables the use of a JSON-based configuration file, a developer may rely upon relatively more Java and/or JSON for development purposes, while still accessing the analytical features of the statistical programming language via the RSpeed package.

FIG. 4 illustrates an additional example RCloud notebook 400 which utilizes an RSpeed package in accordance with the present disclosure. In the example of FIG. 4, notebook 400 utilizes direct function calls or access to RSpeed APIs, in contrast to the RCloud notebook 200 of FIG. 2, which utilizes the configuration file 300 of FIG. 3. For illustrative purposes, FIG. 4 includes labels for several sections of code in notebook 400. The first section 410, creates a new RSpeed metadata object via a call to the "new" function call of the "RSpeed Meta" API, assigns the object to "rs," and sets a title of the object "rs" to "Launches by Market." The second section 420 of notebook 400 creates a new "data source" object via a call to the "new" function call of an "RSpeedDataSource" API of the RSpeed package, and assigns the object to "rsds." The last command in section 420 adds the object "rsds" to the RSpeed metadata object "rs."

The third section 430 of notebook 400 creates a new "form field" object via a call to the "new" function call of an "RSpeedFormField" API of the RSpeed package, and assigns the object to "rsff1." Additional parameters of the object "rsff1" are assigned based upon the additional R code is section 530. The last command in section 430 adds the object "rsff1" to the RSpeed metadata object "rs." Similarly, the fourth section 440 creates an additional new "form field" object "rsff2", assigns additional parameters, and adds the object "rsff2" to the RSpeed metadata object "rs." The operations of section 440 are substantially similar to the operations of section 430. The fifth section 450 of notebook 400, creates a new "data table" object via an invocation of the "new" function call of an "RSpeedDataTable" API of the RSpeed package, and assigns the object to "rsdt." Additional parameters of the object "rsdt" are assigned based upon the additional R code is section 450. The last command in section 450 adds the object "rsdt" to the RSpeed metadata object "rs." The sixth section 450 of notebook 400, creates a new "chart" object via an invocation of the "new" function call of an "RSpeedChart" API of the RSpeed package, and assigns the object to "rsc." Additional parameters of the object "rsc" are assigned based upon the additional R code is section 460. The last command in section 460 adds the object "rsc" to the RSpeed metadata object "rs."

The last section 470 of the notebook 400 creates a new RSpeed web object and assigns it to "rWeb." The additional commands in section 470 enable data table and chart visualizations via the "setDataTable" and "setChart" function calls of the "RSpeedWeb" API. The last command in section 470 renders a visual output of the RSpeed metadata object "rs" in accordance with the parameters of the RSpeed web object "rWeb." For example, since SetDataTable(TRUE) and setChart(TRUE) commands are contained in section 470, the rendering of the visual output may include both a table visualization and a chart visualization that are populated according to the parameters of RSpeed metadata object "rs." Notably, the example notebook 400 of FIG. 4 may generate a similar output to the example notebook 200 of FIG. 2. These examples illustrate the flexibility of the RSpeed package for expanding the functionality of the RSpeed IDE. In particular, the RSpeed functions may be accessed directly via RSpeed APIs, or may be accessed using only a few RSpeed API function calls in conjunction with the use of a configuration file in text-based data interchange format.

FIG. 5 illustrates an example display screen 500 which may be displaying a visual output based upon either the notebook 200 or the notebook 400, illustrated in FIG. 2 or FIG. 4, respectively. In one example, the display screen 500 may be a display screen of a computing device of a developer. In another example, the display screen 500 may be a display screen of a computing device of a user who may be accessing the visual output via a web server over one or more networks. For instance, the visual output may be loaded into a web application container hosted on the web server, or may be accessible from a server hosting an RCloud IDE via the web application container. In the example of FIG. 5, the visual output includes visualizations comprising a data table 510 and a chart 520. The visual output also includes an interactive user interface comprising selectors 530, to select the fields and number of entries for presentation in the chart 510, and a download button 540. For example, the fields of the data table 510 and the chart 520 may be set to default values via code sections 430, 440, 450, and 460 of notebook 400 of FIG. 4. However, an interactive user interface may be provided via a custom HTML or other script. As such, a developer or a user on a device presenting the output on display screen 500 may change the default parameters of the "region" and "market" fields, and may also change the default page size parameter, or number of entries, in the data table 510 via the selectors 530. In addition, the download button 540 may be to download content data associated with the notebook and/or the visualizations in a format that may be accessible to other programs, such as a spreadsheet application, an accounting application, a document preparation application, and so forth. Alternatively, or in addition, the download button 540 may be to download one or more of the visualizations as images that are accessible to other programs.

In one example, the user interface presented on display screen 500 may be defined in a custom HTML page, a CSS, a Java Script embedded in an HTML page, a Java servlet/ applet pair, or the like which may enable interactivity between the computing device associated with display screen 500 and the notebook from which the output is derived. In on example, the user interface may be loaded as at least a portion of a web application container that is hosted on a web server and which is accessible to user devices over a network. In one example, an RCloud server on which the notebook is hosted may also maintain a web socket between the RCloud server and such a web server. In another example, the RCloud server on which the notebook is hosted may maintain a web socket between the RCloud server and the computing device associated with display screen 500. For instance the RCloud server may also function as a web server that provides a web application container for exposing notebook visualizations and/or visual outputs directly to users' computing devices and for directly receiving user inputs via the web socket. In either example, a web socket may be used to pass updated parameters to the RCloud server based upon a user input, e.g., via at least one of the selectors 530. In response to the user input, and based upon the instructions contained in the RCloud notebook, the RCloud server may: update a RSpeed metadata object associated with the RCloud notebook, retrieve additional content data, re-execute an R script with respect to the additional content data, update an RSpeed web object associated with the RCloud notebook, re-render at least one visualization and/or the visual output, and so forth, based upon the updated RSpeed metadata object or the RSpeed updated web object. When the at least one visualization or visual output is re-rendered, the updated visualization or visual output may be passed to the web server (or to the computing device) via the web socket and presented on the display screen 500 in accordance with the file, or script, that defines the user interface.

Figure 6:
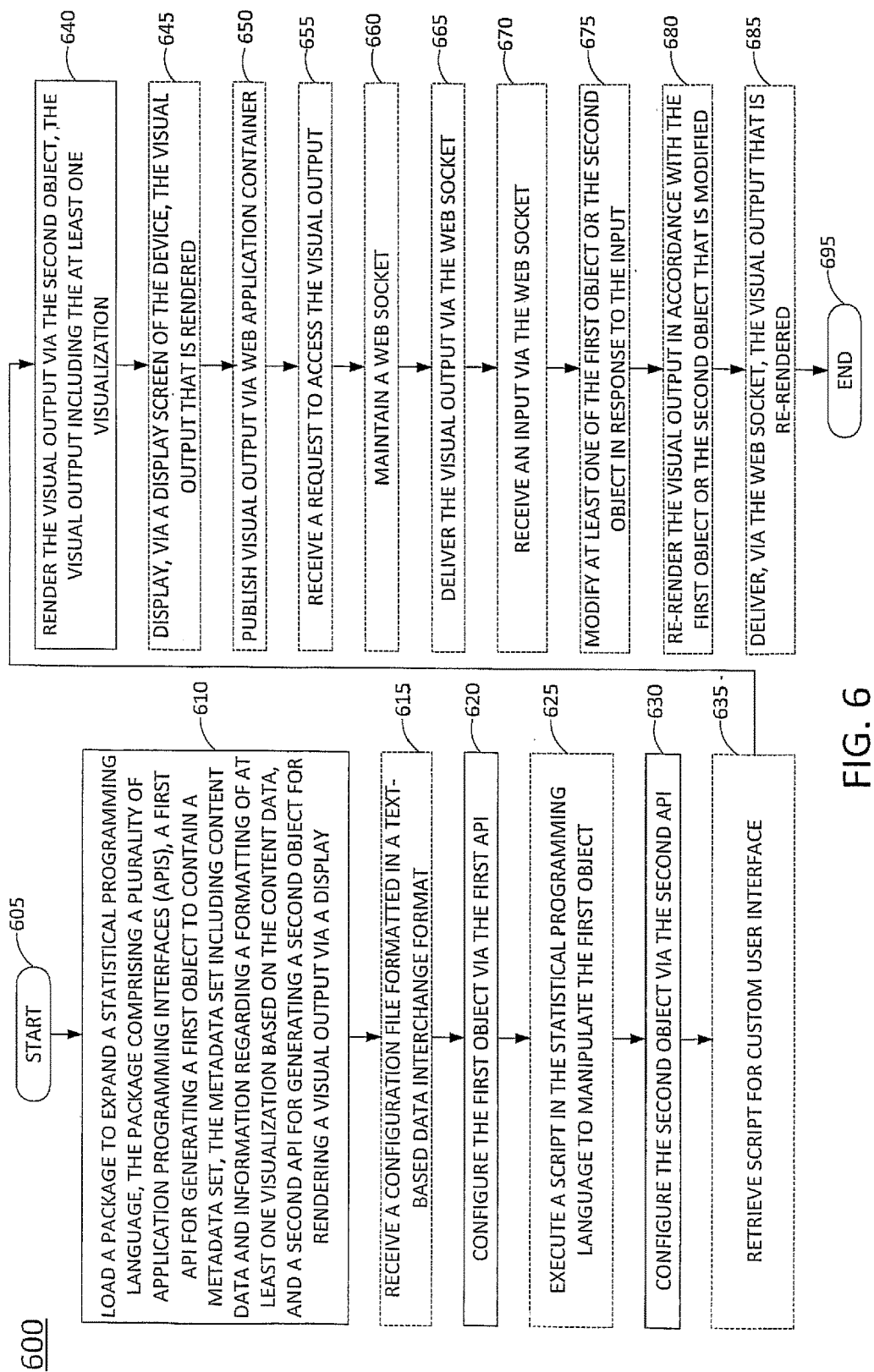
FIG. 6 illustrates an example flowchart of a method for rendering a visual output using a package to expand a statistical programming language, according to the present disclosure.

FIG. 6 illustrates an example flowchart of a method 600 for rendering a visual output using a package to expand a statistical programming language. In one example, the steps, operations, or functions of the method 600 may be performed by any one or more of the components of the system 100 depicted in FIG. 1. For example, in one embodiment, the method 600 is performed by the RCloud server 130, or RCloud server 130 in conjunction with web server 150. For instance, at least a portion of the method 600 may comprise the execution of a script in the statistical programming language. Alternatively, or in addition, one or more steps, operations or functions of the method 600 may be implemented by a computing device having a processor, a memory and input/output devices as illustrated below in FIG. 7, specifically programmed to perform the steps, functions and/or operations of the method. Although any one of the elements in system 100 may be configured to perform various steps, operations or functions of the method 600, the method will now be described in terms of an embodiment where steps of the method are performed by a processor, such as processor 702 in FIG. 7.

The method 600 begins at step 605 and proceeds to step 610. At step 610, the processor loads a package to expand a statistical programming language, e.g., the R language. For instance, the processor may comprise a processor of a server that provides an IDE for the statistical programming language. Thus, the loading of the package may comprise loading the package as a library within the IDE that is running a notebook. In one example, the notebook may comprise a script or file comprising a series or sequence of instructions or commands in the statistical programming language. In one example, the package includes a plurality of APIs which provide access to various function calls that are available within the package. The plurality of APIs may include at least a first API for generating a first object to contain a metadata set, the metadata set including content data and information regarding a formatting of at least one visual output based on the content data. The at least one visual output may comprise a chart, a graph, a table, or a map, for example. In one example, the first object may comprise an RSpeed "metadata object," as described above. The plurality of APIs may also include a second API for generating a second object for rendering a visual output via a display. In one example, the package may include an additional API for populating the metadata set from a configuration file.

At optional step 615, the processor may receive a configuration file in a text-based data interchange format, e.g., JSON. For instance, the configuration file may comprise at least one JSON object storing configuration information or parameters for configuring a metadata object, a web object, a data source object, a chart object, a data table, object, and so forth. In one example, the configuration file may be retrieved via an additional API.

At step 620, the processor configures the first object via the first API. In one example, the configuring the first object via the first API comprises generating the first object via a first function call of the first API, and populating the metadata set for the first object via at least a second function call of the first API. In one example, the at least a second function call may comprise a function call to load the parameters from a text-based data interchange format configuration file into the first object, such as illustrated in the example of FIG. 2. In another example, the at least a second function call may comprise a plurality of function calls via instructions in the notebook formatted in the statistical programming language, such as illustrated in the example of FIG. 4. In one example, step 620 may also include retrieving content data, e.g., utilizing an additional API of the package. For instance, the notebook or the configuration file may specify a data location for obtaining the source data, which may be retrieved and then loaded into the first object.

At optional step 625, the processor executes a script in the statistical programming language to manipulate the first object. For instance, an R script may optionally be utilized to perform various analytical or statistical operations with respect to the content data. New data may be generated based upon calculations with respect to the content data, the content data may be grouped and segregated in various ways, and so on. The script may also result in the modification of other aspects of the first object, such as a heading of a chart or a data table, the portions of the content data that are specified to be included in such a chart or data table, and so forth.

At step 630, the processor configures the second object via the second API. In one example, the configuring the second object via the second API comprises generating the second object via at least a first function call of the second API, and setting at least one parameter of the second object for rendering a visual output via at least a second function call of the second API.

At optional step 635, the processor may retrieve a script for a custom user interface. For instance, the custom user interface may be defined in a custom HTML file, CSS, Java applet, servlet, or applet/servlet pair, a Java Script embedded in an HTML file, or the like. In one example, the custom user interface may provide interactive features to a device on which the visual output may be displayed.

At step 640, the processor renders the visual output via the second object, where the visual output includes the at least one visualization. For instance, the first object may include parameters for the at least one visualization. The at least one visualization may comprise, for example: a chart, a data table, a graph, a map, and so on. As such, the parameters for the at least one visualization that are stored in the first object may include, a number of source data elements to include in a data table, the rows and columns of a data table, and the names of such rows and columns, axis labels for a graph and the content data to be utilized in rendering a plot of the graph, and so forth. In one example, step 635 may be in response to a command in the notebook invoking a function call of the second to render the visualization. In one example, the command may specify that the visualization is to be rendered on the basis of the first object, e.g., its content data and other parameter for rendering the at least one visual output that are contained therein. For instance, step 640 may be in response to commands of line 9 of the notebook 200 of FIG. 2, or in response to the commands of section 470 of the notebook 400 of FIG. 4. In one example, the rendering may include rendering a default user interface provided by the IDE or by the package. In another example, step 640 may include rendering the visual output utilizing a custom user interface, e.g., if such an option is enabled via the notebook or via a configuration file. Following step 640, the method 600 may proceed to step 695 where the method ends, or may proceed to optional step 645.

At optional step 645, the processor may display, via a display screen of a device, the visual output that is rendered at step 640. In one example, the device may comprise a device of a developer. In one example, the display may be in accordance with a default user interface as provided by the package and or the IDE of the statistical programming language. In another example, the display may include a presentation of the at least one visualization via the custom user interface that is retrieved at optional step 635.

At optional step 650, the processor may publish the visual output via a web application container. For instance, the at least one visualization, the custom user interface, or the custom user interface and the at least one visualization, may be loaded into a web application container and made available to remote devices over a network, e.g., via the Internet, a corporate intranet, a local area network (LAN), and so forth. For instance, the processor may also function as a web server, or may load the at least one visualization, the custom user interface, or the custom user interface and the at least one visualization into a web application container hosted on a separate web server.

At optional step 655, the processor may receive a request to access the visual output. For instance, a remote device may connect to the processor functioning as a server or to a separate web server and may request to access the visual output, e.g., by submitting a uniform resource locator (URL) identifying corresponding to the web application container and/or the visual output.

At optional step 660, the processor may maintain a web socket. For instance, the custom user interface may feature interactive inputs which can result in changes to the at least one visualization or the user interface itself. Therefore, a web socket may be maintained between the processor and a web server, or between the processor and the remote device to facilitate transmission of user inputs back to the processor and transmission of updated visualization(s) and/or visual outputs to the web server and/or to the remote device.

At optional step 665, the processor may deliver the visual output via the web socket. For instance, in one example, the processor may function as a web server. As such, a web socket may be maintained between the processor and the remote device (e.g., without a separate web server as an intermediary). In another example, a web application container may be hosted on a web server for providing access to the visual output. For instance, the user interface may comprise a servlet/applet pair. Thus, in one example, user inputs may be accepted via the applet running on the remote device and passed to a servlet of the web application container operating on the web server. The servlet may cause the web server to request the visual output from the processor. Thus, in one example, the visual output may be delivered by the processor at optional step 665 in response to such a request.

At optional step 670, the processor may receive an input for interacting with the visualization via the web socket. For instance, as mentioned above, a user may change the default parameters of different data table fields, change a default page size parameter or number of entries in a data table, and so on, or manipulate other types of visualizations in various ways through inputs via the user interface. For instance, a custom user interface may include selectors for making form field selections to adjust such parameters. In one example, the input is received from the device via the web socket. In another example, a web server receives the request and passes the request to the processor via the web socket.

At optional step 675, the processor may modify at least one of the first object or the second object in response to the input. For instance, the input may select a data table to be displayed instead of a chart. Thus, a parameter of the second object for a data table visualization may be set to be enabled, or "TRUE," while a parameter of the second object for a chart visualization may be set to be disabled, or "FALSE." Similarly, different fields may be selected for display, thereby resulting in the changing of certain parameters in the first object that may pertain to a data table. For example, the user may be more interested in activities in the Northeast, versus the Midwest. Therefore, the relevant content data for rendering the data table may be changed to those entries pertaining to the Northeast region. In addition, the labels of one or more columns, rows, or the like in the data table may be updated to reflect the Northeast, sub-regions, such as states within the Northeast, and so on. In one example, the processor may invoke function calls of the first API or the second API to render changes to the first object or the second object. In one example, the processor may also re-execute all or a portion of a custom script in the statistical programming language.

At optional step 680, the processor may re-render the visual output in accordance with the first object or the second object that is modified. For instance, as mentioned above, the input may change the region or market(s) for which content data should be displayed in a data table. Other modifications of a same or a similar nature may further alter the underlying content data from which the at least on visualization should be created, or the way in which the content data should be presented via the at least one visualization, or change the at least one visualization to comprise a different type of visualization. It should be noted that insofar as visualizations are included in the visual output, the re-rendering of a visualization may also be considered to result in the re-rendering of the visual output. As such, at optional step 680 the processor may invoke the second API to re-render the at least one visualization and/or the visual output.

At optional step 685, the processor may deliver, via the web socket, the visual output that is re-rendered. In one example, the processor sends the updated visual output to a web server which may forward the visual output to the device. In one example, a user interface portion of the visual output may remain unchanged, while only a visualization portion of the visual output is updated. Thus, in one example, only an updated visualization or a new visualization is delivered at optional step 685. In another example, the updated visual output is sent to the device via the web socket, e.g., without the web server as an intermediary.

Following optional step 685, the method 600 proceeds to step 695 where the method ends.

In addition, although not specifically specified, one or more steps, functions or operations of the method 600 may include a storing, displaying and/or outputting step as required for a particular application. In other words, any data, records, fields, and/or intermediate results discussed in the method 600 can be stored, displayed and/or outputted either on the device executing the method 600, or to another device, as required for a particular application. Furthermore, steps, blocks, functions or operations in FIG. 6 that recite a determining operation or involve a decision do not necessarily require that both branches of the determining operation be practiced. In other words, one of the branches of the determining operation can be deemed as an optional step. In addition, one or more steps, blocks, functions or operations of the above described method 600 may comprise optional steps, or can be combined, separated, and/or performed in a different order from that described above, without departing from the example embodiments of the present disclosure.

As such, the present disclosure provides at least one advancement in the technical field of interactive statistical and analytical application development. This advancement is in addition to the traditional methods of running R scripts through Java, or packages for R scripts to invoke Java Virtual Machines (JVMs). In particular, the present disclosure uses a statistical programming language, such as R, or back end functions, such as data extraction from data sources, data exploration, analysis, etc., and uses a web programming language, such as Java in the front end to provide interactivity. This leads to more rapid application development and opens up the development of statistical analytical application to developers without in-depth knowledge of the statistical programming language.

The present disclosure also provides a transformation of data, e.g., source data is transformed into additional data or new data, e.g., based upon a script in the statistical programming language for performing statistical or analytical operations on the source data. In addition, the present disclosure also transforms the source data into data representing at least one visualization that characterizes source data.

Finally, embodiments of the present disclosure improve the functioning of a computing device, e.g., a server. Namely, a server for providing a statistical programming language IDE is improved by the use of a package of the present disclosure which expands the functions of the IDE, and hence expands the functions of the server. In addition, embodiments of the present disclosure also improve the functioning of a web server. In particular, a web server of the present disclosure may provide a web application container that enables access to visual outputs of a statistical programming language IDE. Thus, via the web application container, the web server may provide a window to the statistical programming language IDE, with all the capabilities of service layers including security, concurrency, lifecycle management, transaction, deployment, and other services provided via the web application containers, in addition to providing statistical modeling, optimization, machine learning, big data analytics, probability distributions, and the like.

Figure 7:
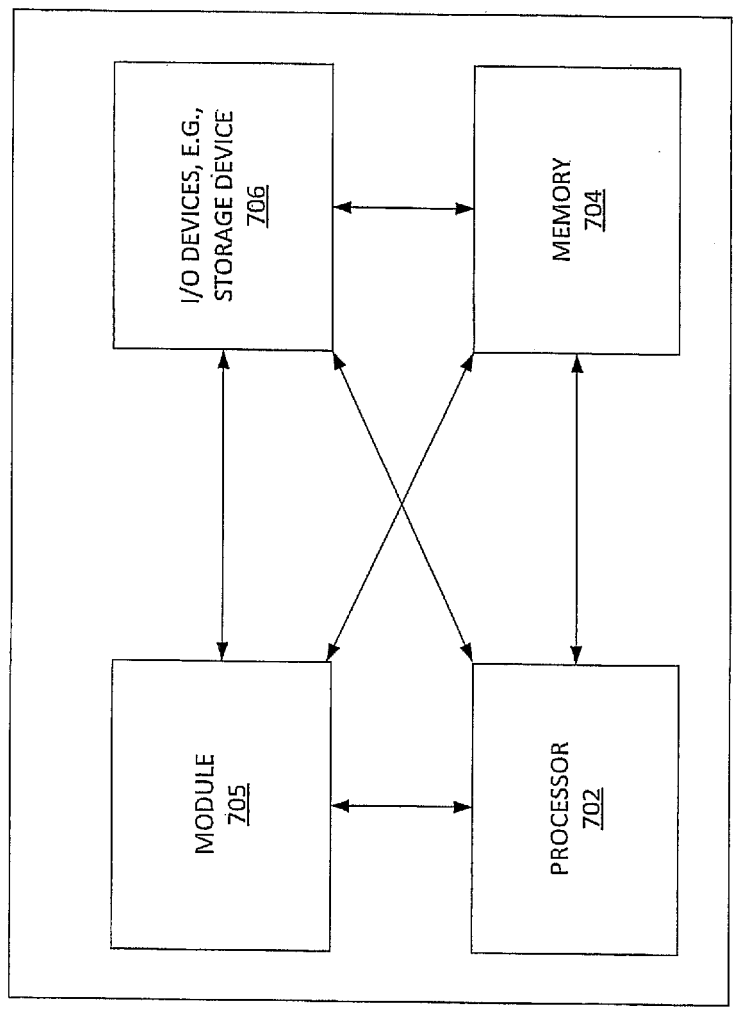
FIG. 7 illustrates a high-level block diagram of a computing device specially programmed for use in performing the functions described herein.

FIG. 7 depicts a high-level block diagram of a computing device suitable for use in performing the functions described herein. As depicted in FIG. 7, the system 700 comprises one or more hardware processor elements 702 (e.g., a central processing unit (CPU), a microprocessor, or a multi-core processor), a memory 704 (e.g., random access memory (RAM) and/or read only memory (ROM)), a module 705 for rendering a visual output using a package to expand a statistical programming language, and various input/output devices 706 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the computing device may employ a plurality of processor elements. Furthermore, although only one computing device is shown in the figure, if the method 600 as discussed above is implemented in a distributed or parallel manner for a particular illustrative example, i.e., the steps of the method, or the entire method is implemented across multiple or parallel computing devices, then the computing device of this figure is intended to represent each of those multiple computing devices.

Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented. The one or more hardware processors 702 can also be configured or programmed to cause other devices to perform one or more operations as discussed above. In other words, the one or more hardware processors 702 may serve the function of a central controller directing other devices to perform the one or more operations as discussed above.

It should be noted that the present disclosure can be implemented in software and/or in a combination of software and hardware, e.g., using application specific integrated circuits (ASIC), a programmable gate array (PGA), including a Field PGA (FPGA), or a state machine deployed on a hardware device, a computing device or any other hardware equivalents, e.g., computer readable instructions pertaining to the method discussed above can be used to configure a hardware processor to perform the steps, functions and/or operations of the above disclosed method. In one embodiment, instructions and data for the present module or process 705 for rendering a visual output using a package to expand a statistical programming language (e.g., a software program comprising computer-executable instructions) can be loaded into memory 704 and executed by hardware processor element 702 to implement the steps, functions, or operations as discussed above in connection with the illustrative method 600. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method can be perceived as a programmed processor or a specialized processor. As such, the present module 705 for rendering a visual output using a package to expand a statistical programming language (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various embodiments have been described above, it should be understood that they have been presented by way of example only, and not a limitation. Thus, the breadth and scope of a preferred embodiment should not be limited by any of the above-described exemplary embodiments, but should be defined only in accordance with the following claims and their equivalents.

What is claimed is:
1. A device comprising:
a processor; and a computer-readable medium storing instructions which, when executed by the processor, cause the processor to perform operations, the operations comprising:
loading a package to expand a statistical programming language, wherein the package comprises a plurality of application programming interfaces, the plurality of application programming interfaces including:
a first application programming interface for generating a first object to contain a metadata set, the metadata set including content data and information regarding a formatting of at least one visualization based on the content data; and
a second application programming interface for generating a second object for rendering a visual output via a display;
configuring the first object via the first application programming interface;
configuring the second object via the second application programming interface;
retrieving a script for a custom user interface, wherein the visual output includes the custom user interface; and
rendering the visual output via the second object, the visual output including the at least one visualization.

2. The device of claim 1, wherein the configuring the first object via the first application programming interface comprises:
generating the first object via a first function call of the first application programming interface; and
populating the metadata set for the first object via at least a second function call of the first application programming interface.

3. The device of claim 2, wherein the configuring the second object via the second application programming interface comprises:
generating the second object via a first function call of the second application programming interface; and
setting at least one parameter of the second object for rendering the visual output via at least a second function call of the second application programming interface, wherein the at least one parameter of the second object activates a presentation of the at least one visualization in the visual output.

4. The device of claim 3, the operations further comprising:
retrieving a configuration file, wherein the configuration file is formatted in a text-based data interchange format.

5. The device of claim 4, wherein the statistical programming language comprises R language, and wherein the text-based data interchange format comprises java script object notation.

6. The device of claim 4, the package further including:
a third application programming interface for populating the metadata set for the first object from the configuration file, wherein the populating the metadata set for the first object comprises applying the configuration file to the first object, via the third application programming interface, to populate the metadata set.

7. The device of claim 3, wherein the first function call and the second function call are implemented via instructions of a notebook file in the statistical programming language.

8. The device of claim 7, wherein the operations further include:
executing a script in the statistical programming language to manipulate the first object, prior to the rendering the visualization, wherein the script in the statistical programming language is contained in the notebook file or is retrieved via an instruction of the instructions in the notebook file.

9. The device of claim 8, wherein the first object is manipulated via the script in the statistical programming language by performing statistical operations on the content data.

10. The device of claim 7, wherein the populating the metadata set for the first object is based upon at least one instruction of the instructions in the notebook file.

11. The device of claim 10, wherein the at least one parameter of the second object for rendering the visual output is extracted from the notebook file.

12. The device of claim 1, wherein the at least one visual output comprises:
a chart;
a graph;
a table; or
a map.

13. The device of claim 1, wherein the operations further comprise:
displaying, via a display screen of the device, the visual output that is rendered.

14. The device of claim 1, wherein the operations further comprise:
publishing the visual output via a web application container.

15. The device of claim 14, wherein the custom user interface includes a server side script and a client side script, and wherein the web application container is hosted on a web server.

16. The device of claim 14, wherein the operations further comprise:
receiving a request to access the visualization;
maintaining a web socket;
delivering the visualization via the web socket;
receiving an input for interacting with the visualization via the web socket;
modifying at least one of the first object or the second object in response to the input;
re-rendering the visualization in accordance with the first object or the second object that is modified; and
delivering, via the web socket, the visualization that is re-rendered.

17. The device of claim 16, wherein the request to access the visualization is received from a device over a network.

18. A non-transitory computer-readable medium storing instructions which, when executed by a processor, cause the processor to perform operations, the operations comprising:
loading a package to expand a statistical programming language, wherein the package comprises a plurality of application programming interfaces, the plurality of application programming interfaces including:
a first application programming interface for generating a first object to contain a metadata set, the metadata set including content data and information regarding a formatting of at least one visualization based on the content data; and
a second application programming interface for generating a second object for rendering a visual output via a display;
configuring the first object via the first application programming interface;
configuring the second object via the second application programming interface;

retrieving a script for a custom user interface, wherein the visual output includes the custom user interface; and rendering the visual output via the second object, the visual output including the at least one visualization.

19. A method, comprising:

loading, by a processor, a package to expand a statistical programming language, wherein the package comprises a plurality of application programming interfaces, the plurality of application programming interfaces including:

a first application programming interface for generating a first object to contain a metadata set, the metadata set including content data and information regarding a formatting of at least one visualization based on the content data; and a second application programming interface for generating a second object for rendering a visual output via a display;

configuring, by the processor, the first object via the first application programming interface;

configuring, by the processor, the second object via the second application programming interface;

retrieving, by the processor, a script for a custom user interface, wherein the visual output includes the custom user interface; and rendering, by the processor, the visual output via the second object, the visual output including the at least one visualization.

20. The method of claim 19, further comprising:

retrieving, by the processor, a configuration file, wherein the configuration file is formatted in a text-based data interchange format.

\* \* \* \* \*